United States Patent [19]
Killias

[11] 4,185,771
[45] Jan. 29, 1980

[54] WATER MIXING VALVE WITH TEMPERATURE REGULATION, TEMPERATURE SETTING AND VOLUME CONTROL

[75] Inventor: Rudolf Killias, Gossau, Switzerland

[73] Assignee: Albert Lins, Küsnacht, Switzerland

[21] Appl. No.: 849,937

[22] Filed: Nov. 9, 1977

Related U.S. Application Data

[63] Continuation-in-part of Ser. No. 794,032, May 5, 1977, abandoned.

[30] Foreign Application Priority Data

Feb. 18, 1977 [CH] Switzerland .......................... 2068/77
Aug. 31, 1977 [CH] Switzerland ........................ 10617/77

[51] Int. Cl.² ............................................ G05D 23/00
[52] U.S. Cl. ..................................... 236/12 R; 137/90
[58] Field of Search .......................... 236/12 R; 137/90

[56] References Cited

U.S. PATENT DOCUMENTS

| | | | |
|---|---|---|---|
| 3,112,879 | 12/1963 | Killias | 236/12 R |
| 3,228,603 | 1/1966 | Norman | 236/12 R |
| 3,765,604 | 10/1973 | Trubert et al. | 236/12 R |
| 3,792,812 | 2/1974 | Knapp | 236/12 R |
| 3,929,283 | 12/1975 | Delpla | 236/12 R |
| 4,029,256 | 6/1977 | Dauga | 236/12 R |

*Primary Examiner*—James C. Mitchell
*Attorney, Agent, or Firm*—Frishauf, Holtz, Goodman & Woodward

[57] ABSTRACT

In a cylindrical casing, a temperature regulation system shifts a valve sleeve body axially between valve seats of the cold and hot water inlets and a flow control lever mounted on screw threads propels a valve seat body mounted as a piston within the casing and carrying one of the valve seats so as to vary the distance between the two valve seats between which the sleevelike valve body moves. The control rod of the temperature regulating system passes through the valve seat body to bear against a balance spring the other end of which is adjustable by a temperature setting grip that varies the compressive force on the spring, but an adjusting device is interposed between the control rod and the spring for slightly varying the effective rod length in accordance with the position of the flow-control lever so as to compensate for a tendency of the controlled temperature to shift from the preset value when the total flow is varied.

6 Claims, 4 Drawing Figures

WATER MIXING VALVE WITH TEMPERATURE REGULATION, TEMPERATURE SETTING AND VOLUME CONTROL

This is a continuation-in-part of my copending patent application Ser. No. 794,032, filed May 5, 1977, now abandoned.

The present invention concerns a mixing valve device for hot and cold water containing an automatic temperature control system for the mixed water provided with manual setting controls for temperature and for the quantity, or rather the rate of flow, of the mixed water outflow.

U.S. Pat. No. 3,112,879 owned by the assignee of the present application shows such a mixing valve device of a kind commonly known in Europe as a "mixing gun," having a temperature sensor comprising a control bellows located in a mixing chamber surrounded by the casing of the device, the temperature sensor control valve means regulating the entry of cold and hot water to the mixing chamber. At one end of the casing is a manual setting control for the temperature control system and also a handle for controlling the aggregate flow through the valve means.

It is important in such devices to provide a flow quantity control effective for the valves regulating the inflow of cold and hot water to the mixing chamber, in comparison with other systems in which the total flow control is provided for the outlet opening or the exit of mixed water from the mixing chamber, arrangements that also involve the interposition of a check valve.

The flow quantity control of the above-identified U.S. patent operates continuously by means for shifting the relative spacing between the movable valve closure parts of oppositely operating valves for the cold and hot water inflow respectively to the mixing chamber. This requires a relatively great device length, because the oppositely movable valve closure parts seated on the control rod of the temperature control system require a great deal of space. This great device length prevents the use of this type of mixing valve for flush mounting of the controls. The arrangement heretofore used involves relatively great complication and expense for provision of the flow quantity control. A quite substantial disadvantage also exists in these devices that for every actuation of the flow quantity control, either for opening or closing of the mixing valve, a torque is exerted on the control rod carrying the movable valve seat parts, which leads at least to friction losses at the control bellows and thus undesirably influences the automatic temperature control, apart from which there is possible wear of the control bellows from alternating stresses exerted by this torque.

For example, there is disclosed in Austrian Pat. No. 293,688 and British Pat. No. 1 262 323 of the same assignee, a so-called central mixer for warm water supply installations of which the temperature control system cooperates with a so-called alternating valve that has only a single common valve body for both valves. That is possible in this case because in this valve there is provided neither temperature regulation nor flow quantity control.

It is an object of the present invention to provide a mixing valve device of the kind generally described above, which will overcome the disadvantages of the previously available devices, while having a relatively short axial length and which will be distinguished by a very simple construction and capable of providing temperature regulation with high precision.

It is a further object of the invention to provide a mixing valve with the advantages just mentioned in which variation of the total flow volume will not disturb the operation of a thermostatic mixing control.

SUMMARY OF THE INVENTION

Briefly, to accomplish the first object of the invention, the valve means are arranged in an alternating valve form and are provided with a sleeve-shaped valve closure member, mounted on the control rod that extends into and is affixed to the control bellows of the temperature control system, and this valve closure body cooperates with valve seats respectively opposite its ends having sealing surfaces, while a rotary flow-quantity control hand cooperates with means for axially shifting the relative distance between the two valve seats. To accomplish the second object of the invention, the means for axially shifting the relative distance between the two valve seats is coupled to means for varying the force provided for opposing or balancing the action of the control bellows preferably under control of a temperature setting. Preferably, a spring provides that balancing force and its effect is preferably varied by an arrangement for changing the effective length of the control rod.

In this manner, it is now possible to shorten very greatly the heretofore usual and necessary length of the mixing valve device, because an alternating valve as a rule requires less space than the previously used counter-operating valves. In particular, the change of the relative distance between the two valve seats of the alternating valve in accordance with the present invention, is a comparatively simple and sturdy construction that, moreover, can operate much more precisely, because no torque is applied to the control rod of the temperature regulation system by operation of the back-and-forth rotation of the mixing valve handle that propels the mixing valve closure body axially.

Preferably the construction is so designed that the valve seat which is more remote from the mixing chamber is constituted as an axially shiftable valve seat body guided after the manner of a piston in the casing of the device and operatively connected with the flow quantity control handle. Preferably also the free end of the control rod of the temperature control system passes through the valve seat body just mentioned and bears directly or indirectly against the compensating or balancing spring of the temperature regulation system, the other end of which spring bears against the temperature regulation setting control. In the preferred form of the invention the control rod bears indirectly against that spring, bearing against a shell forming an adjustable axial extension of a pressure disk bearing against the spring and subject to automatic adjustment in response to operation of the flow-quantity control handle.

In order to adapt the mixing valve device of the invention for installation in any plumbing fixture casing for either surface or flush mounting, in upright or horizontal position or directly in sanitary installations, quite interchangeably, the construction form can be such that the casing of the mixing valve has inlet openings for cold and hot water and also an outlet opening for the mixed water and has its end remote from the manual controls constituted as a mandrel interchangeably insertable in a variety of pluming fixture casings. Preferably, the construction is such that the casing has screw threads, a threaded bushing or a threaded retaining collar put around it between its free end and its control handles.

The invention is further described by way of illustrative examples with reference to the annexed drawings, in which.

Figure 1:
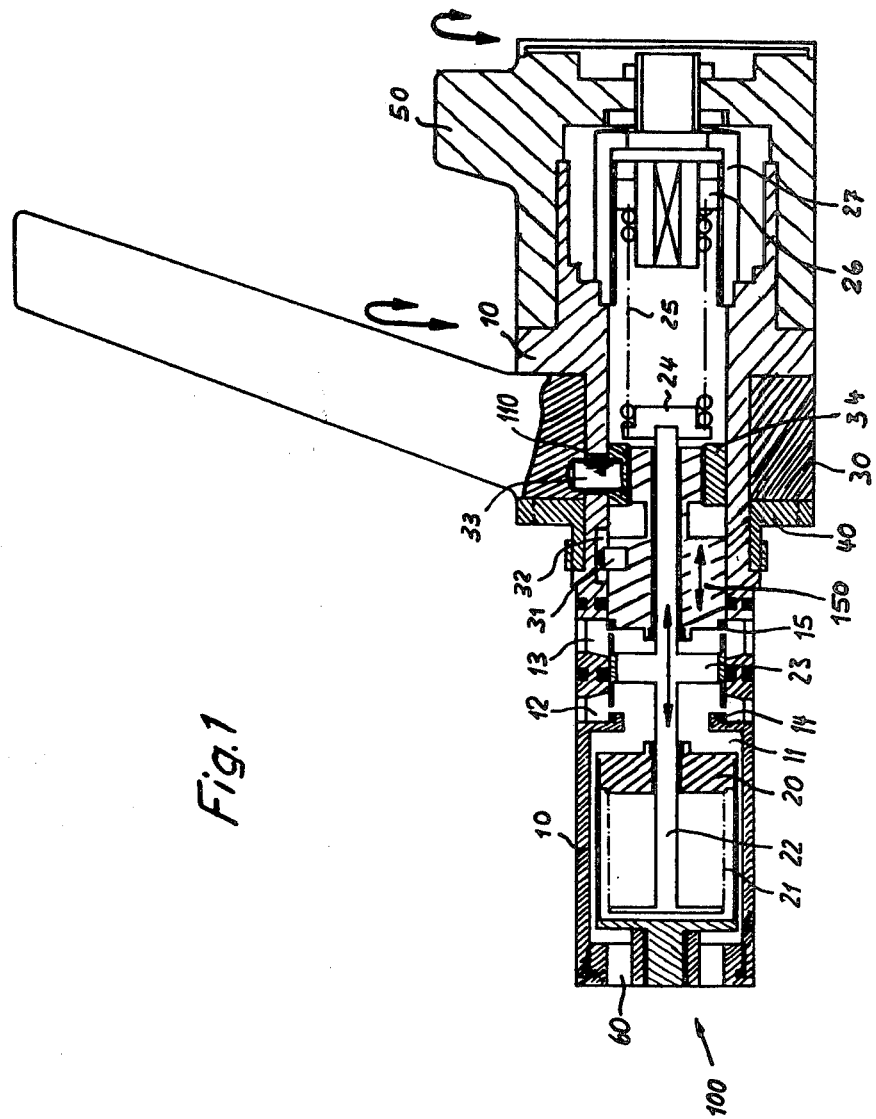
FIG. 1 is an axial section of a mixing valve device illustrating a basic principle of the invention.

The mixing valve device as shown in FIG. 1 comprises a sleeve- or shell-like casing 10 of which one end is in the form of an insertion mandrel 100 and its other end has, successively, a threaded bushing nut 40 or a threaded retaining collar nut (not shown), a flow quantity control handle 30 in the shape of a lever and a temperature control setting grip 50.

The mandrel 100 comprises essentially a mixing chamber 11 surrounded by a casing 10, in which chamber the temperature sensor 20 having a control bellows 21 is located. The temperature sensor 20 is a component of a temperature control system and is of conventional construction and contains, as is common, an expansion medium, so that the temperature changes in the mixed water cause the bellows to change its axial length. The movement of the bellows is transmitted to a control rod 22 which passes through a portion of the casing 10 and at its end remote from the control bellows, is subjected to the effect of a balancing spring 25 through a disk member 24 for applying the spring pressure to the rod end. As described below with reference to FIG. 2, it is preferred to modify the member 24 to provide a compensating adjustment for the temperature control. The balance spring 25 at its other end bears against a setting ring 26 that is mounted in a threaded shell for axial displacement and can be shifted axially by rotation of the temperature setting grip 50 that thus applies a variable compression force on the balancing spring 25, which force represents a measure for the mixed water temperature set by the temperature setting grip 50. Such temperature control systems for outflowing mixed water are in general well known.

On the inflow side of the mixing chamber 11, a so-called alternating valve is provided having a valve closure body 23 in the form of a sleeve or shell affixed by appropriate radial supports on the control rod 22. This valve closure body 23 has sealing surfaces at its ends that cooperate respectively with valve seats 14 and 15, which face the valve closure body ends across the respective inlets 12 and 13 for cold and hot water that are provided in the casing 10.

For a given axial distance between the two valve seats 14 and 15, the valve closure body can approach more closely to the valve seats 14 for restricting the inflow of cold water or more closely to the valve seat 15 for restricting the flow of hot water, according to the axial control movement of the control rod 22 and the previously set temperature at the temperature setting grip 50 (spring bias). The resulting mixed water leaves the casing 10 through an endwise opening 60 in the casing 10.

Flow quantity (rate) control of the water through the device, by turning on or turning off the inflows, is provided in accordance with the invention by changing the axial distance between the two valve seats 14 and 15.

For the purpose just mentioned, the valve seat 15 which is the one of the two valve seats that is the more remote from the mixing chamber 11, is provided in the form of an axially displaceable valve body 150 slidably mounted after the manner of a piston in the casing 10. By a shifting of this valve body 150 out of its open position which is illustrated in FIG. 1 towards the left in the drawing, thus by reducing the distance between the two valve seats 14 and 15, the throughflow rate or quantity through the inlet openings 12 and 13 can be restricted down to complete closing, the latter condition occurring when the two valve seats 14 and 15 both lie firmly against the ends of the sleeve 23.

As is clearly visible in FIG. 1, the control rod 22 passes through this shiftable valve body 150 practically free of contact therewith, apart from a seal packing in the inlet region for hot water. The expense for the flow quantity control is kept very low, since the operative connection between the displaceable valve body 150 and the quantity-control handle 30 can be provided in the simplest way. In the illustrated example, an inner threaded bushing 34 is provided that surrounds the valve body 150 and is coupled so as to propel it axially, the bushing 34 being connected through a radial guide channel 110 by means of a positioning pin 33 to the quantity control handle 30. The limit provided by the member 40 to the angular movement of the control handle 30 can accurately limit the stroke length of the valve body 150. The latter is, furthermore, advantageously provided with a rotation guard arrangement comprising a pin 31 that slides in an axial groove 32 on the inside of the casing 10.

In the structure of FIG. 1 as shown a problem arises because the flow quantity control momentarily changes the cross-section of the inlet opening for the hot water, which also momentarily changes the temperature of the mixed water. This temperature change disturbs the equilibrium between temperature sensor and balance spring, so that the system shifts axially until this equilibrium is restored. The displacement of the control rod in one axial direction or the other, however, also changes the pressure on the balancing spring on which the control rod bears, which pressure is in effect a measure for the preset temperature for which the mixing is to be controlled. An equilibrium of the arrangement accordingly takes place that no longer corresponds to the temperature setting. Particularly in the case of relatively cold water mixtures, in which the hot water channel is barely open, it is necessary when the tap is opened up, which causes the hot water channel to be suddenly opened wide by the moving away of the valve seat body, for the valve rod with the movable valve member to travel over a considerable path in order to close down the hot water flow back to an appropriate value. This path of travel raises the pressure on the spring substantially, so that the equilibrium in the system will now set in at a substantially higher temperature than what was preset.

It is therefore necessary to constitute the mechanism in such a way that, in response to the flow quantity control, an automatic and at least approximately proportional compensating adjustment of the temperature setting of the temperature control is produced. Such an arrangement is illustrated in FIG. 2, which replaces a simpler mechanical connection illustrated in FIG. 1, which means that the preferred embodiment of the present invention is one in which the construction of FIG. 2 is incorporated in the corresponding portion of FIG. 1.

Figure 2:
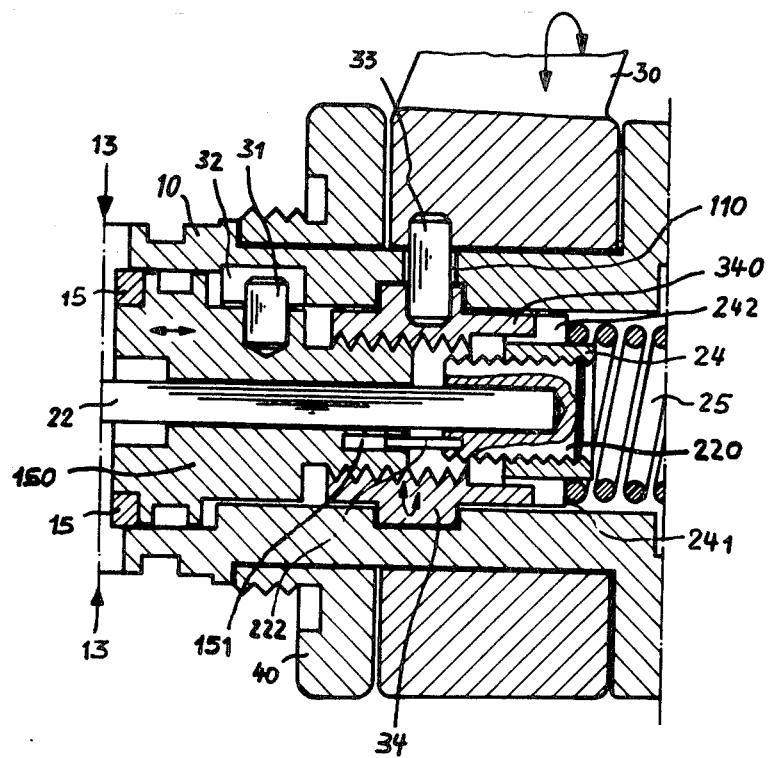
FIG. 2 is an axial section of the modified portion of a preferred modification of the mixing valve device of FIG. 1.

Basically, the construction shown in FIG. 2 provides for coupling the rotary threaded bushing 34 with a coaxial adjustment bushing 220 threaded into the cap disk 24 that bears against the spring 25, the coupling being fixed with respect to rotation of the bushing 34 and 220 but allowing axial displacement of one bushing from the other. The adjustment bushing 220 operates as an adjustable extension in the axial direction of the cap disk 24 and has the same effect as an adjustable extension of the length of the control rod 22, since the control rod bears against the bottom of a socket in the bushing 220 within which it is freely rotatable so that it does not partake of the rotary movement of the bushing.

Parts shown in FIG. 2 which are the same as or correspond to parts shown in FIG. 1 are designated by the same reference numerals. As explained with reference to FIG. 1, the valve seat body 150 is guided so as to be axially displaceable in piston fashion within the casing 10. The pin 31 sliding in an axial groove 32 on the inside of the case 10 prevents the valve seat body 150 from rotating relative to the casing while allowing it to be displaced axially. As also described with reference to FIG. 1, this valve seat body 150 carries the valve seat 15 of the hot water valve that controls the outflow from the hot water inlet 13.

The axial displacement of the valve seat body 150 for setting the desired total rate of flow of water is produced by the flow-control threaded bushing 34, which is connected with the rotary flow quantity control handle 30 by means of the positioning pin 33 which moves in a circumferential groove 110 in the casing 10 that extends over a predetermined range of rotational angle around the circumference of the casing 10.

In FIG. 2, as in FIG. 1, the control rod 22 of the temperature regulation system passes freely through the valve seat body 150, but instead of bearing directly on the pressure disk or cap 24 that bears against the balance spring 25, it bears against an externally threaded bushing or shell 220. The pressure cap or disk 24 that bears against the spring 25 in FIG. 1 becomes in the case of FIG. 2 an internally threaded bushing 24 that bears against the spring 25 with its annular shoulder 241 that has longitudinal grooves 242 into which projections 340 of the flow-control bushing 34 extend, so that the temperature-setting adjustment bushing 24 is forced to rotate with the flow-control bushing 34 but is permitted to be displaced axially relative to the flow-control bushing 34. The externally threaded shell 220, on the other hand is held against rotary movement by the pin 222 set in the shell 220 that slides in and out of the bore 151 provided for the purpose in the adjacent end of the valve seat body 150. Of course, several of these pins may be provided or some other splining system could be used for the same purpose. The shell 220 may be referred to as the length-compensation shell or bushing since it functions to vary the effective length of the control rod 22. Rotation of the spring-cap bushing 24 in response to rotation of the flow control bushing 34 causes the length compensation shell 220 to be displaced axially within the spring-cap bushing 24.

The position of the parts shown in FIG. 2 corresponds to a condition in FIG. 1 in which the valves for the cold water inelt 12 and the hot water inlet 13 are not quite open, while a temperature setting is provided that holds the movable valve member 23 mounted on the control rod 22 of the temperature control system approximately in the middle of its operating range.

If for example an increase of the total water flow is to be produced, the flow-quantity control handle 30 is so rotated that the similarly rotated control bushing 34 displaces the valve seat body 150 to the right in the drawing. With this rotary movement the control bushing 34 also turns the spring-cap bushing 24 and displaces the length compensation shell 220 axially, likewise to the right in the drawing, a movement which the control rod 22 can follow without raising the pressure it exerts on the balance spring 25 as the temperature control system, responding to the momentarily larger hot water flow into the mixing chamber, seeks to restore the disturbed equilibrium condition by an axial movement of the control rod 22, here again a movement towards the right in the drawing.

The change in the flow control in the direction of reducing the flow functions in exactly the same way, but with an axial movement of all the participating members which is to the left in the drawing.

In each case the internally threaded bushing 24 that caps the spring 25 maintains its relative position within the casing, as can readily be seen, so that the preset spring pressure is also maintained and the preset temperature setting is hence also reached again after the responding movement of the temperature sensor device. Since the movable valve member 23 must travel over a greater correcting distance for the same flow increase at lower water mixture temperatures than at higher water mixture temperatures, an absolutely constant maintenance of the temperature setting over the entire regulation range can naturally not be obtained. In comparison to the operation of the uncompensated structure shown in FIG. 1, these deviations from a constant temperature setting are negligible. Optimization can be obtained by fitting the relation, between the regulation displacement and the control rod length change, determined by the pitch of the threading of the bushings to a calibration value in the neighborhood of the preferred water mixing temperature at the tap, for example the commonly preferred shower temperature of 37° C.

Figure 3:
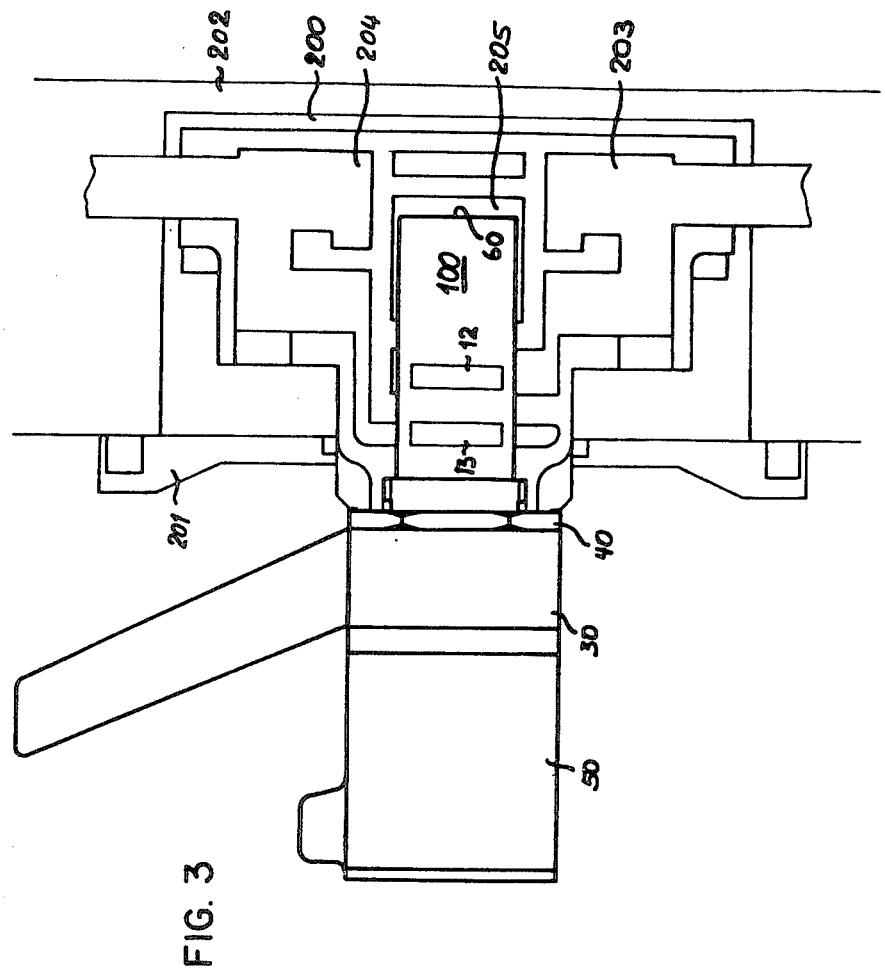
FIG. 3 is a diagram of a flush-mounted arrangement of the mixing valve device of FIG. 1.

FIG. 3 illustrates in what a simple way the above-described mixing valve device can be flush mounted on a plumbing fixture. The fitting 200 of the plumbing fixture is seated behind a diaphragm 201 in a wall 202 and is so provided with flow channels 203,204 and 205 for cold, hot and mixed water that their openings are flush with the openings 12,13 and 60 respectively of the inserted mandrel 100. With the threaded bushing nut 40, the installed mixing valve device can easily be mounted.

Figure 4:
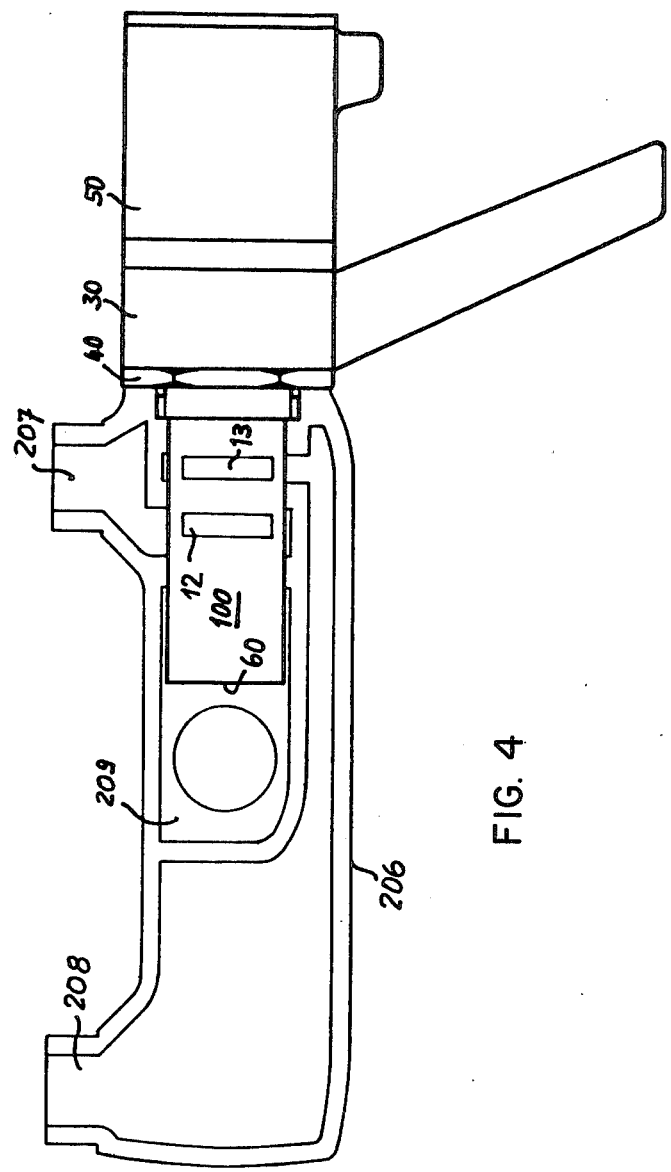
FIG. 4 is a diagram of a surface-mounting device of the mixing valve device of FIG. 1.

FIG. 4 illustrates the mounting of mixing valve device in a projecting fashion to form a mixing gun with a casing 206, in which the openings of the flow channels 207,208 and 209 fit flush with the openings 12,13 and 60 of the inserted mandrel 100, the firm mounting on the fitting being again provided by the threaded collar 40.

As described above, the mixing valve device of the present invention is a relatively simple, sturdy and compact construction and a control characteristic that has up to now hardly ever been reached.

Although the invention has been described with reference to a particular illustrative example, it will be understood that variations and modifications are possible within the inventive concept.

I claim:

1. A mixing valve device for hot and cold water having an automatic temperature control for the outflowing water that comprises a temperature sensor including a control bellows disposed in a mixing chamber contained within a casing and valve means controlled by said temperature sensor for controlling the inflow of cold and of hot water to said mixing chamber, and in which said casing at one of its ends has both a manual temperature setting control for the automatic temperature control and a manual flow quantity setting means for controlling the aggregate flow through said valve means, said mixing valve having the improvement wherein, in combination:

said valve means comprise a sleeve shaped valve closure body (23) mounted on a control rod (22) affixed to and movable by said control bellows (21), and also valve seats (14, 15) having sealed surfaces opposite the ends of said sleeve shaped valve closure body (23);

said flow quantity manual control (30) is connected with axial shift-producing means (150, 31-34) for changing the relative spacing between the respective valve seats (14 and 15) disposed at opposite ends of said valve closure body and said casing (10), at its end opposite that at which the manual flow-quantity control and temperature setting means (30 and 50) are provided, is formed as a mandrel (100) for interchangeably installing the device in a plumbing fixture casing and said mandrel is provided with peripheral openings (12,13), respectively, for cold and hot water, axially displaced from each other, and an outlet opening (60) at its tip for the mixed water.

2. A mixing valve device for hot and cold water having an automatic temperature control for the outflowing water that comprises a temperature sensor including a control bellows disposed in a mixing chamber contained within a casing and valve means controlled by said temperature sensor for controlling the inflow of cold and hot water to said mixing chamber, and in which said casing at one of its ends has both a manual temperature setting control for the automatic temperature control and a manual flow quantity setting means for controlling the aggregate flow through said valve means, said mixing valve having the improvement wherein, in combination:

said valve means comprise a sleeve shaped valve closure body (23) mounted on a control rod (22) affixed to and movable by said control bellows (21), and also valve seats (14, 15) having sealed surfaces opposite the ends of said sleeve shaped valve closure body (23);

said flow quantity manual control (30) is connected with axial shift-producing means (150, 31-34) for changing the relative spacing between the respective valve seats (14 and 15) disposed at opposite ends of said valve closure body, and that one (15) of said valve seats that is the more distant from said mixing chamber (11) is located on an axially displaceable valve seat body (150) movable as a piston in said casing (10) and operatively connected mechanically with said manual flow-quantity control (30).

3. A mixing valve device as defined in claim 2, in which said control rod (22) of the temperature control device has a free end passing through said valve seat body (150) and in which the temperature control device includes an equalization spring (25) for applying pressure to said free end of said control rod (22) that passes through said valve seat body (150), said spring being displaceable for varying the pressure applied by it to said control rod.

4. A mixing valve device as defined in claim 3, in which a first threaded control bushing (34) is provided between said valve seat body (150) and said manual flow-quantity control (30) for axial displacement of said valve seat body (150) by non-axial movement of said manual flow-quantity control, and in which, for improvement of the effectiveness of said temperature setting means (50) over the range of operation of said flow quantity control means (30), there are interposed between said free end of said control rod (22) and said spring (25):

a second threaded control bushing (24) having a surface portion (241) bearing axially against said spring (25) and having means (242) for mechanical engagement with a portion (340) of said first control bushing (34) constraining said two control bushings (34, 24) to rotate together but allowing them to move apart or together axially, and a threaded member (220) having a surface against which said free end of said control rod (22) bears axially, mounted in threaded engagement with said second threaded control bushing (24) and provided with means (222) for constraining it against rotation.

5. A mixing valve device as defined in claim 4, in which said second threaded control bushing (24) is internally threaded and said threaded member (220) in threaded engagement therewith is externally threaded and in which said means (222) for constraining said threaded member against rotation comprises an axially sliding linkage with said valve seat body (150).

6. A mixing valve device as defined in claim 4, in which said casing (10) is provided with threads (40) or a threaded collar nut between its free mandrel shaped end (100) and the manual flow-quantity control and temperature setting means (30 and 50) for affixing said casing (10) to the casing of a plumbing fixture.

* * * * *